United States Patent
Calsyn et al.

(10) Patent No.: US 7,634,759 B2
(45) Date of Patent: Dec. 15, 2009

(54) DISTRIBUTED DEBUGGER ENVIRONMENT

(75) Inventors: Martin R. Calsyn, Bothell, WA (US); Georgios Chrysanthakopoulos, Seattle, WA (US); Vasileios Zissimopoulos, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 455 days.

(21) Appl. No.: 11/001,100

(22) Filed: Dec. 1, 2004

(65) Prior Publication Data

US 2006/0129988 A1  Jun. 15, 2006

(51) Int. Cl.
G06F 9/44 (2006.01)
(52) U.S. Cl. ........................ 717/124; 717/129
(58) Field of Classification Search ................ 717/124, 717/129
See application file for complete search history.

(56) References Cited

U.S. PATENT DOCUMENTS

| | | | |
|---|---|---|---|
| 5,870,607 A * | 2/1999 | Netzer | 717/127 |
| 6,157,957 A * | 12/2000 | Berthaud | 709/248 |
| 6,219,803 B1 * | 4/2001 | Casella et al. | 714/38 |
| 6,836,881 B2 * | 12/2004 | Beynon et al. | 717/128 |
| 7,036,052 B2 * | 4/2006 | Pierce et al. | 717/124 |
| 7,096,458 B2 * | 8/2006 | Bates et al. | 717/124 |
| 7,185,319 B2 * | 2/2007 | Kaler et al. | 717/124 |
| 7,350,194 B1 * | 3/2008 | Alpern | 717/124 |
| 2005/0144457 A1 * | 6/2005 | Lee et al. | 713/176 |

OTHER PUBLICATIONS

Wismuller, R., "Debugging Message Passing Programs Using Invisible Message Tags", http://wwwbode.informatik.tu-muenchen.de/~wismuell, 8 pages.

* cited by examiner

Primary Examiner—Wei Y Zhen
Assistant Examiner—Junchun Wu
(74) Attorney, Agent, or Firm—Woodcock Washburn LLP

(57) ABSTRACT

Systems and methods for providing distributed debugging in an extensible SOAP environment of asynchronous software web services are disclosed. Such a system may include a message originator, a diagnostics tagger, an intended message receiver, and a debug controller, which may communicate with one another via SOAP messages. The message originator originally puts the SOAP message onto the network. The diagnostics tagger modifies the SOAP message to include certain diagnostics elements that cause a breakpoint to be triggered. The intended message receiver eventually receives the message and is expected to trigger the breakpoint. The debug controller is a process that is called by the intended message receiver when a breakpoint is detected. The header of the SOAP message may include a security element and a diagnostics element. The diagnostics element may include one or more breakpoint elements. Each breakpoint element may include a debugging controller element, and one or more condition elements. Each condition element may include a logical expression. The intended message receiver determines whether the conditions are met. If the conditions are met, then the breakpoint is triggered.

16 Claims, 6 Drawing Sheets

```
<envelope>
  <header>
    <security>
      ... authentication and encryption information for body elements....
      ... authentication and encryption information for individual breakpoints ...
    </security>
    <diagnostics>
      <breakpoints>
        <breakpoint>
          <DebuggingController>soap.rdmap://martinca2/DebugController/...<DebuggingController>
          <conditions>
            <condition>logical expression (in inner xml)</condition>
            <condition>logical expression (in inner xml)</condition>
          </conditions>
        </breakpoint>
      </breakpoints>
    </diagnostics>
  </header>
  <body>
    ...
  </body>
</envelope>
```

FIG. 3

DISTRIBUTED DEBUGGER ENVIRONMENT

FIELD OF THE INVENTION

Generally, the invention relates to computer program debuggers. More particularly, the invention relates to systems and methods for providing distributed debugging in an extensible SOAP environment of asynchronous software web services.

BACKGROUND OF THE INVENTION

In the past, computer programs could be considered a stack of instructions executed sequentially on a single machine. The developer, typically using a debugger running on the same machine, could set a breakpoint at some point in the stack. When the breakpoint is encountered, the program stops running. The developer could then glean whatever information might be of interest.

Nowadays, computer programs often run in a "distributed" environment, where programs run across a plurality (tens, sometimes hundreds) of networked machines. Processes distributed among the several machines communicate with each other over the network via simple object access protocol ("SOAP") messages. Consequently, a developer might not be on the machine running the portion of the program he wants to break.

In a distributed environment, a developer could "attach" to the machine-of-interest and evaluate the program remotely. Sometimes, however, the developer does not know which of the plurality of machines is running the portion of the program he wants to break. The developer might not even know that the machine he wants to break exists. For example, the developer, at a first machine, might send a message to a second machine. Unknown to the developer, however, the second machine sends a message to a third machine in order to perform the function required by the message sent from the developer's machine. The second machine gets its answer from the third machine and sends the first machine its answer. The developer at the first machine may have no idea that the third machine was even involved in the processing. The third machine, however, might be the machine that the developer needs to break to determine what is wrong with the program. Thus, there is a need in the art for a distributed debugging system that works in this environment.

SUMMARY OF THE INVENTION

The invention provides systems and methods for distributed debugging in an extensible SOAP environment of asynchronous software web services. A system according to the invention may include a message originator, a diagnostics tagger, an intended message receiver, and a debug controller. The components may communicate with one another via messages, which may be SOAP messages, for example, communicated over a network such as the Internet.

The message originator originally injects the SOAP message into the network. The diagnostics tagger modifies the SOAP message to include certain diagnostics elements that cause a breakpoint to be triggered. The intended message receiver eventually receives the message and is expected to trigger the breakpoint. The intended message receiver calls back to the debug controller when a breakpoint is detected. In general, any combination of the message originator, the diagnostics tagger, the intended message receiver, and the debug controller may be on the same or different machines.

The header of the SOAP message may include a security element and a diagnostics element. The diagnostics element may include one or more breakpoint elements. Each breakpoint element may include a debugging controller element, and one or more condition elements. Each condition element may include a logical expression. The intended message receiver determines whether the conditions are met. If the conditions are met, then the breakpoint is triggered.

When the intended message receiver determines that the breakpoint has been triggered, then the intended message receiver sends to the debug controller a message indicating that the breakpoint has been triggered. An identity of the debug controller may be included in the debugging controller element of the SOAP message. The debug controller is typically run on a machine that includes a debugger user interface.

BRIEF DESCRIPTION OF THE DRAWINGS

FIG. 3 provides an example SOAP message that includes diagnostics in accordance with the invention.

DETAILED DESCRIPTION OF ILLUSTRATIVE EMBODIMENTS

Exemplary Computing Environment

Figure 1:
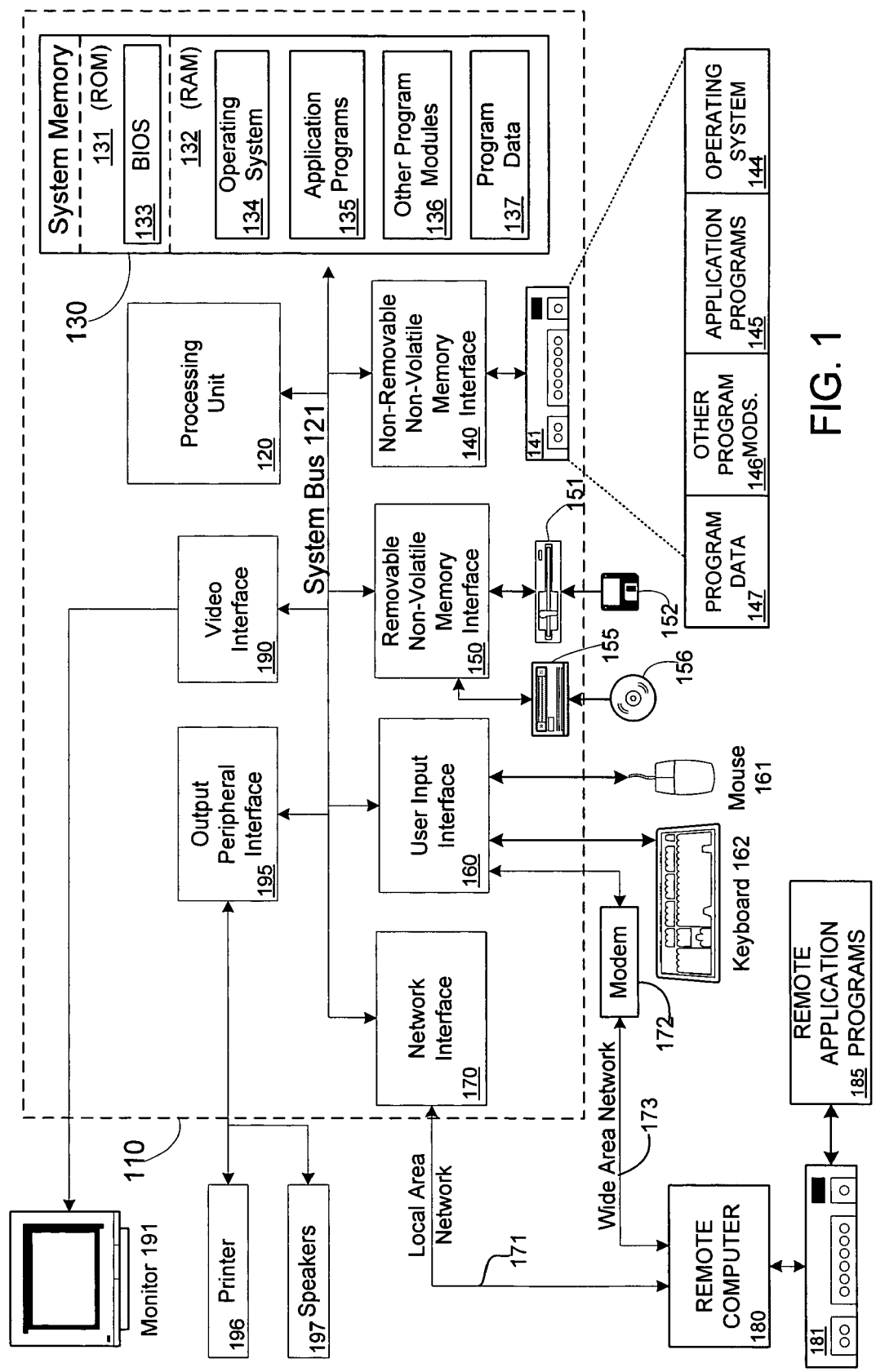
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a LAN 171 and a WAN 173, but may also include other networks. Such networking environments are commonplace in offices, enterprise-wide computer networks, intranets and the internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Example Embodiments of a Distributed Debugging Environment

Figure 2:
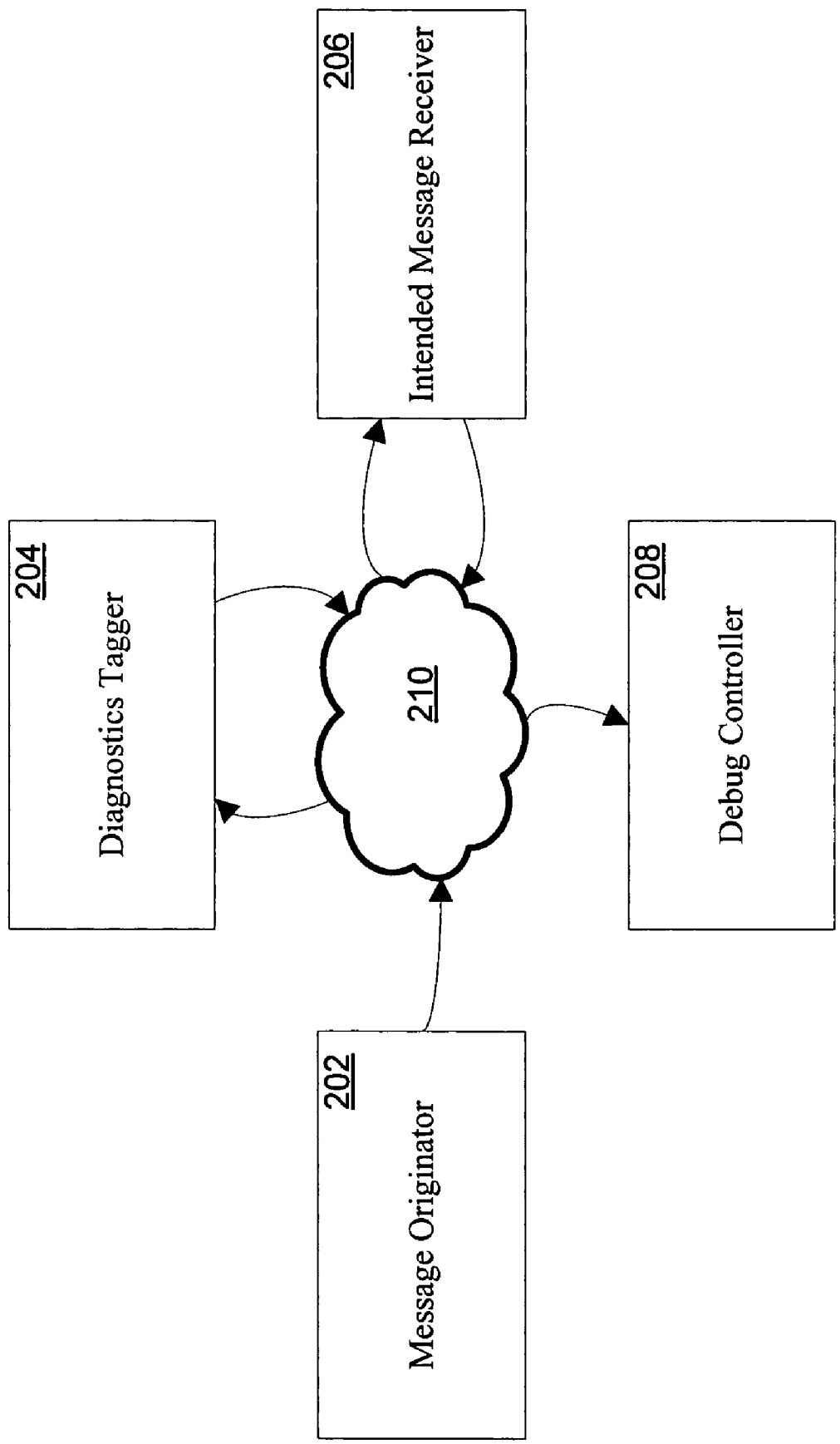
FIG. 2 is a functional block diagram of an example embodiment of a message-based distributed debugging system according to the invention.

FIG. 2 is a functional block diagram of an example embodiment of a message-based distributed debugging system according to the invention. As shown, the system may include a message originator 202, a diagnostics tagger 204, an intended message receiver 206, and a debug controller 208. The arrows in FIG. 2 depict message traffic between the several system components and the network 210, which may be the Internet or an intranet, for example, or any other wide- or local-area network. The messages may be SOAP messages, for example.

SOAP is a well-known, lightweight, XML-based distributed computing protocol. A SOAP message is an XML document that comprises a SOAP envelope. The envelope includes an optional SOAP header and a mandatory SOAP body. The SOAP message header represents the metadata of the message and provides a way to extend SOAP. The SOAP message body is the actual message payload. The details of a remote procedure call including the arguments are described in the envelope that is transported from one application to another over a selected protocol (e.g., HTTP).

The message originator 202 is the process that originally puts the SOAP message onto the network 210. The diagnostics tagger 204 is a process that modifies the SOAP message to include certain diagnostics elements that cause a breakpoint to be triggered. Such diagnostics elements are described in detail below. The intended message receiver 206 is the process that eventually receives the message and is expected to trigger the breakpoint. The debug controller 208 is a process that is called by the intended message receiver 206 when a breakpoint is detected. The debug controller 208 is typically run on a machine that includes a debugger user interface. Such user interfaces are well-known, and, therefore, need not be described in detail herein.

FIG. 3 provides an example SOAP message that includes diagnostics in accordance with the invention. The envelope of such a SOAP message, designated between <envelope> and </envelope>, may include a header, designated between <header> and </header>, and a body, designated between <body> and </body>. The actual body elements are irrelevant to the distributed debugger of the invention, and, therefore, need not be discussed in detail. Suffice it to say that the body may include any element that the body of a typical SOAP message might include, as is known in the art.

The header may include a security element, designated between <security> and </security>, and a diagnostics element, designated between <diagnostics> and </diagnostics>. The diagnostics element may include one or more breakpoint elements, collectively designated between <breakpoints> and </breakpoints>. Each breakpoint element, designated between <breakpoint> and </breakpoint>, may include a debugging controller element, designated between <DebuggingController> and </DebuggingController>, and one or more conditions elements, collectively designated between <conditions> and </conditions>, individually designated between <condition> and </condition>.

Each condition element may include a logical expression, in linear XML, for example. The intended message receiver determines whether the conditions are met (e.g., whether the logical expressions are "true"). If the conditions are met, then the breakpoint is triggered.

When the intended message receiver determines that the breakpoint has been triggered, then the intended message receiver "calls back" (i.e., sends a message indicating that the breakpoint has been triggered) to the debug controller. An identity of the debug controller may be included in the debugging controller element of the SOAP message. Such an identity may include an address associated with the processor (e.g., computer) on which the debugging controller is running.

The security element may include authentication and encryption information for the body elements and authentication and encryption information for the individual breakpoints. Security in SOAP headers is well-known. Such security typically includes an identity, a signature, and encryption. If the signature matches the body, then it can be assumed that the body was written by the identity. The encryption obscures the contents of body. The authentication and encryption information ensures that only those services that are permitted access to the body (e.g., to read, write, or interpret the body) will have access to the body.

According to the invention, the SOAP message may also include security entries that correspond to the diagnostics element, the individual breakpoints. Each such security element may include an identity, a signature, and encryption associated with the corresponding breakpoint. Thus, a service may determine whether or not the debugging controller has authority to access the service, and services with access to the header of the SOAP message are, in general, a disjoint group from those that can access the body.

In accordance with the invention, a breakpoint may be set on message creation or consumption. Further, a breakpoint may be set on a specific message, on a message type, or on a service. To set a break point on a specific message, the diagnostics element of the SOAP header may indicate that the debug service that receives the message should cause the program to break and call back to the debug controller identified in the diagnostics element of the message if it determines that the conditions identified in the diagnostics element of the message have been satisfied. To set a break point on a message type, the debugger could send a respective message to each of one or more machine that causes the one or more machines to break if they ever encounter a message of a specified type. To set a break point on a service, the diagnostics element of the SOAP header may indicate that if a specified service receives the message, the service should call back to the debug controller identified in the diagnostics element of the message.

The message originator may or may not be the message tagger. The message tagger may be an intermediary that does not originate the message. The intermediary intercepts the message and changes the message to include the diagnostics (e.g., the diagnostics element and optional diagnostics security). If the message already includes diagnostics, the intermediary may change the diagnostics. Thus, a developer may set a breakpoint even if he is not the originator of the message. Also, it should be understood that the message originator, the message tagger, and the target may have different security credentials.

When a recipient service determines that a breakpoint has been triggered, the recipient service calls back to the debugging controller identified in the diagnostics element. The debugging controller may be the message originator, the message tagger, or any third party.

A message may include more than one breakpoint, which may be added to the message by the same message tagger or different message taggers. For example, a first message tagger may add a first breakpoint to the message and a second tagger may add a second breakpoint to the message. If a service detects that the first breakpoint has been triggered, then the service detecting the trigger calls back the debug controller associated with the first breakpoint. If a service detects that the second breakpoint has been triggered, then the service detecting the trigger calls back the debug controller associated with the second breakpoint.

If the message tagger does not know the identity of the intended recipient, the message tagger may "gossip" the breakpoint conditions to the intended recipient. That is, the message tagger may add the desired diagnostics information into one or more messages that the message tagger suspects will go to the intended recipient to tell any service that detects the breakpoint to call back the identified debugging controller. For example, the message tagger could tag every message the developer sends. The message could also cause any service that interprets it to communicate it to still other services.

It is anticipated that, sometimes, each of two developers will tag respective messages for the same intended recipient. Additionally, the program system may be in use by any number of people who are not developing, but are also sending messages to that same service. It should be understood that a process comprises a number of threads, and that threads receive and process messages. Thus, a process can handle multiple messages concurrently, with each message being handled by corresponding thread. Accordingly, when a breakpoint is detected, the thread that detects the breakpoint stops processing. Consequently, the other threads keep processing messages without regard to the fact that the thread that detected the breakpoint has stopped. Thus, debugging does not stop the process, and the users of the process are unaffected. Similarly, even while a first developer has stopped a first thread of the process, a second developer can break on a second thread.

Figure 4:
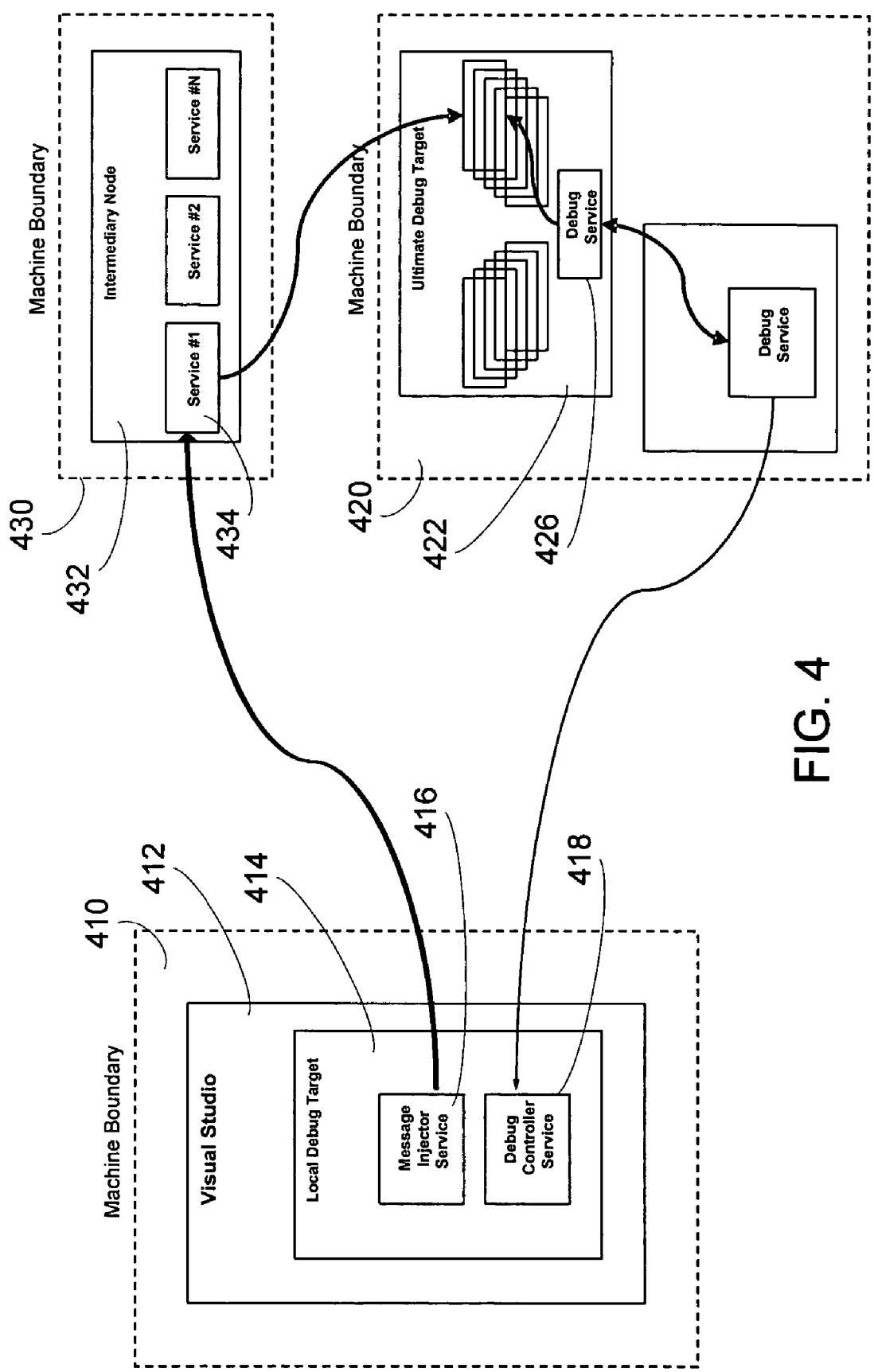
FIG. 4 is a block diagram of an example embodiment of a message-based distributed debugging system according to the invention.

FIG. 4 is a block diagram of an example embodiment of a message-based distributed debugging system according to the invention. Such an embodiment may include a plurality of machines (e.g., computers) 410, 420, 430 interconnected via a communications network such as the Internet, for example.

As shown in FIG. 4, machine 410 is the machine from which the developer is controlling the debugging operation and, therefore, may include a visual studio 412 having a user interface to the distributed debugger. The local debug target 414 may include a message injector service 416 and a debug controller service 418 (described above). The message injector service 416 is for injecting into the network SOAP messages that, as described above, include diagnostics elements in their headers.

The SOAP messages may be received by a service 434 running on a second machine 430 that includes intermediate node functionality 432. One or more services 434 may be running on the intermediate node 432. In the example scenario shown in FIG. 5, the service 434 at the intermediate node 432 passes a SOAP message to the machine 420 running the ultimate debug target 422. As the SOAP header traverses the intermediate node(s), it becomes the new stack call frame.

The ultimate debug target 422 may process as a plurality of threads 424 running concurrently on the machine 420. A debug service 426 parses the SOAP messages and determines that there are diagnostics in the SOAP header. After passing any diagnostics security that might be present, the debug service 426 determines whether or not the conditions set forth in the diagnostics element of the SOAP header are satisfied. If the conditions are met, the debug service triggers the breakpoint. That is, the debug service causes the thread that received the message to stop processing, and calls back to the debug controller service 418. The developer, using the visual studio 412, may then gather information from the ultimate debug target 422.

Time Services In A Distributed Debugging Environment According To The Invention

Figure 5:
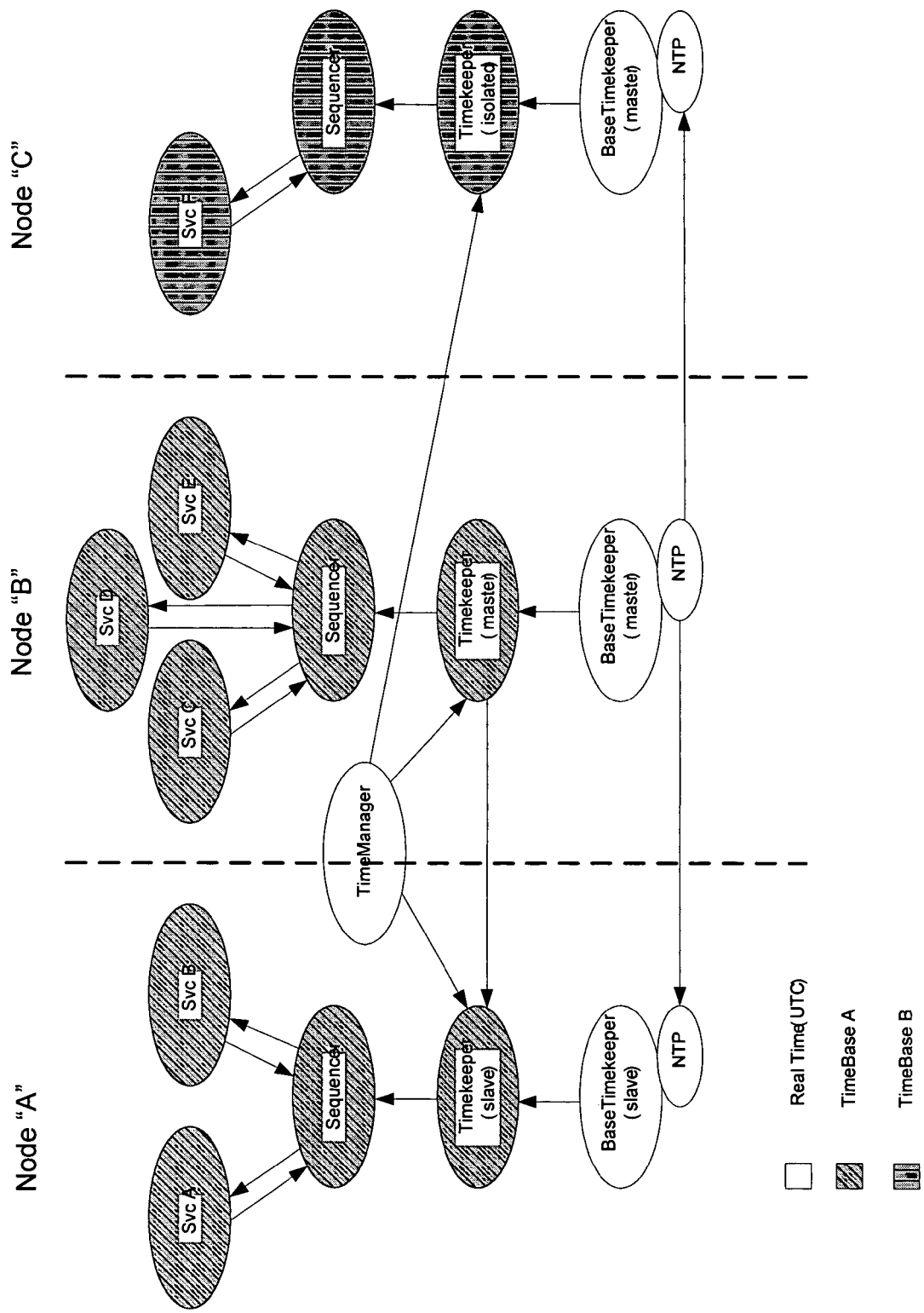
FIG. 5 depicts time services that may be employed in a distributed debugging environment according to the invention.

According to an aspect of the invention, the concept of synchronized systems may be employed in connection with distributed debugging. FIG. 5 depicts time services that maybe employed in a distributed debugging environment according to the invention. This time aspect may be integrated both within the debugger and within the target service code such that multiple distributed services can be affected in a uniform fashion. In this context, time may be "frozen," using standard time wsap services, to make distributed debugging feasible.

As shown, each node may have a base timekeeper service as a core service. The base timekeeper service may maintain the currently running "real time." This time base may be maintained as close to coordinated universal time (UTC) as possible.

If a node is in isolation, the concept of time may be the local machine system clock. If a node is part of an active ring, a base timekeeper master may be chosen using a server election process based upon highest network time protocol (NTP) accuracy, for example. The NTP algorithm may then be used to synchronize all base timekeepers on the same ring.

In an example embodiment, the base timekeeper may be initially isolated and self-running, using local machine UTC. While in the isolated state, the base timekeeper may periodically attempt to search for other nodes. When other nodes are discovered, the base timekeeper will engage in a server election process with the other nodes to determine which node's base timekeeper is the best time master. If this node is joining a mature ring (e.g., a ring having more than two nodes populated and running), a base timekeeper master will already exist. In this case, the server election process will still run, but there is a diminishing likelihood that the current master will be unseated as more nodes join the ring.

Every node may have at least one timekeeper service, though some nodes may have more than one timekeeper for debugging purposes or for timed media. The timekeeper services may expand upon the features of the base timekeeper by permitting timing adjustments for debugging or other purposes. The timekeeper state may include values that specify the linear relationship between the timekeeper and real time (as represented by the local base timekeeper). A given timekeeper may serve as a master for a group of other timekeepers. This may be useful in order to manage a group of timekeepers.

A "sequencer" may compose with the timekeeper and serve as a common service for periodic and non-periodic alerts. Other services may compose with the sequencer to manage timeouts and other timing signals. The sequencer service may query the associated timekeeper to learn the current time. To generate an expiration alert, the sequencer may subscribe to the associated timekeeper. In this fashion, timing events may be managed by the sequencer, while the progression of time is controlled by the underlying timekeeper.

A time manager may maintain one or more groups of time keepers that are to be managed together. All timekeepers on a ring may be in the same group. In certain cases, however, it may be desirable to manage separate timebases, for example, if directed debugging of certain nodes or services is desired.

In the example depicted in FIG. 5, two nodes (designated "A" and "B") are enlisted in one timebase, while a third node (designated "C") maintains a separate timebase. This permits structured debugging where a collection of nodes is being debugged while other nodes continue to process at normal speed. Though not shown, a single node can instantiate multiple timekeepers and sequencers, if desired, in order to debug factions (i.e., groups of services) within a node.

To support message playback, all messages may be timestamped. The timestamp may be generated from the base timekeeper, as this may be the true representation of message ordering.

Accordingly, multiple CPUs may be slaved to one distributed master clock so that timestamps across machines can be rationalized. Otherwise, clock drift between machines could make comparison of time traces non-useful. In addition, time may be slowed down, halted, or even reversed across machines so as to uncover timing-related bugs in the debugger.

Causality Tracking in a Distributed Debugging Environment According to the Invention According to an aspect of the invention, a marker, which may be an additional SOAP header, for example, may be attached to a message. When that message is consumed by another service, that service may be added to a "causality tree." Any subsequent messages, even different messages that may emanate from the newly marked service, may trigger downstream breakpoints to other services. This concept may be applied in a system according to the invention when, for example, the target of the message is unknown and the developer wishes to "infect" other services so that the other services, in turn, trip a breakpoint when they call further downstream services.

Three variants of causality tracking are currently contemplated. Standard tracking trips the next service to touch the message, as well as every subsequent service in a fan-out pattern. "Step over" causality functions similarly to the standard stack-based "step over" functions (i.e., do not break on the next service, but break on any subsequent services). Filtered causality tracking provides for the creation of filters for services that the developer does not want to break into. Such services may include, for example, helper services or previously debugged services.

Figure 6:
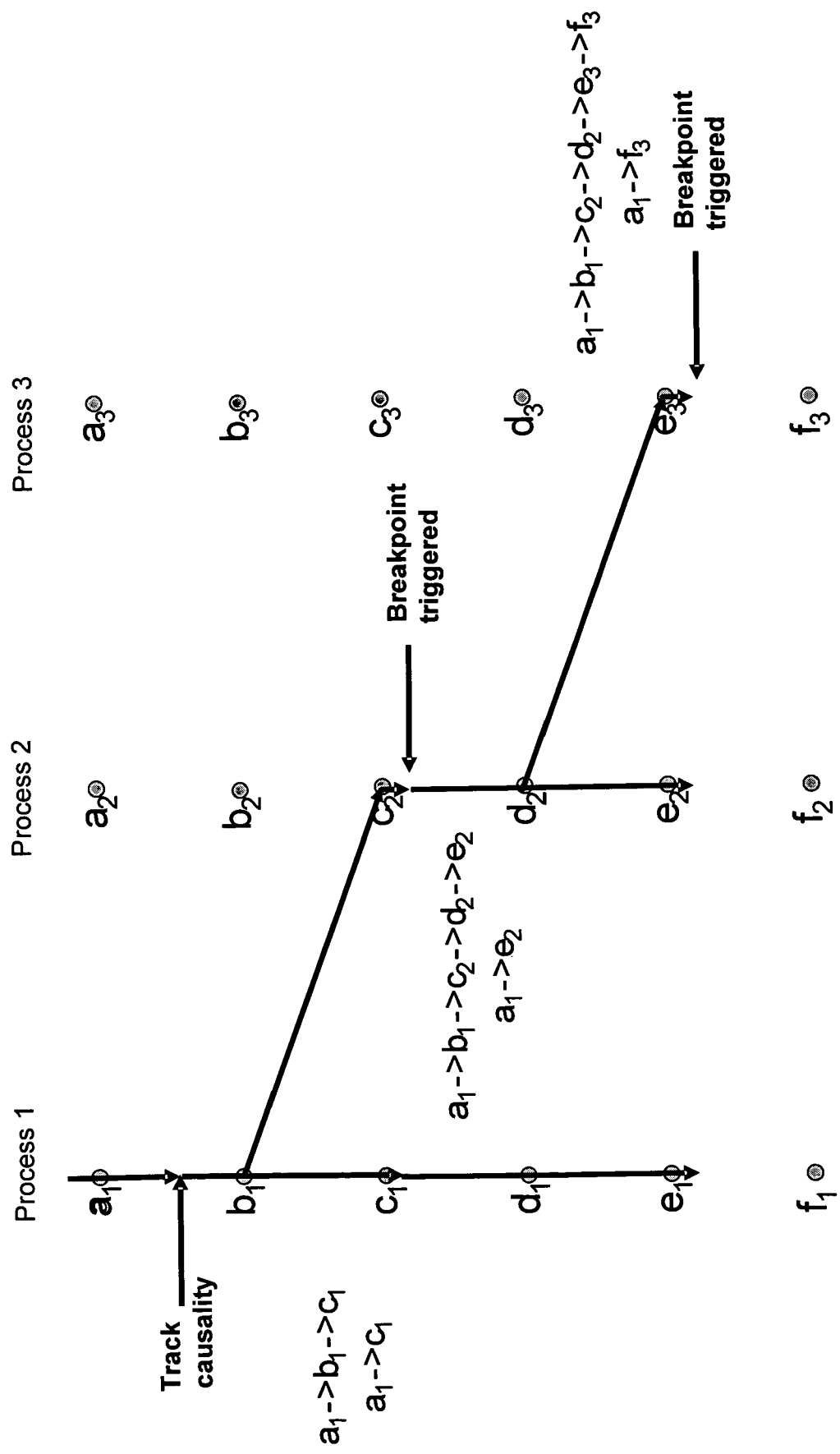
FIG. 6 depicts an example scenario of causality tracking that may be employed in a distributed debugging environment according to the invention.

FIG. 6 depicts an example scenario of causality tracking that may be employed in a distributed debugging environment according to the invention. As shown, a message in process 1 may be modified (between states $a_1$ and $b_1$, for example) to include a marker, such as an additional SOAP header. The states of process 1 continue to progress, and no breakpoints are triggered in process 1. Subsequently, however, whenever the message is consumed by another service, a breakpoint is triggered. For example, when the message is sent from process 1 (at state $b_1$) to process 2 (at state $c_2$), a breakpoint is triggered. The states of process 2 continue to progress, and no further breakpoints are triggered. When the message is sent from process 2 (at state $d_1$) to process 3 (at state $e_3$), a breakpoint is triggered. Thus, even where the target of the message is unknown, the developer may "infect" other services so that the other services, in turn, trip a breakpoint when they call further downstream services.

Thus, there have been described systems and methods for distributed debugging in an extensible SOAP environment of asynchronous software web services. Though the invention has been described in connection with certain preferred embodiments depicted in the various figures, it should be understood that other similar embodiments may be used, and that modifications or additions may be made to the described embodiments for practicing the invention without deviating therefrom. The invention, therefore, should not be limited to any single embodiment, but rather should be construed in breadth and scope in accordance with the following claims.

What is claimed:

1. A distributed debugger system for use in an extensible Simple Object Access Protocol (SOAP) environment of asynchronous software web services, the system comprising:
    a first computing device that injects into a communications network a message that includes a first breakpoint together with a security entry for the first breakpoint, the security entry including at least one of a) an identity, b) a signature, or c) encryption of the first breakpoint; and
    a second computing device configured as an intermediary message tagger device that receives the message, authenticates the message and inserts into the message, a second breakpoint that is different than the first breakpoint, and,
    the second computing device sends to a third computing device, the message containing authentication information and the first and second breakpoints; and the debugger processes the message on the third computing device;
    wherein a first call back message is sent by the third computing device to the first computing device if the first breakpoint has been triggered, and a second call back message is sent by the third computing device to the second computing device if the second breakpoint has been triggered.

2. The system of claim 1, wherein at least one of the first and second breakpoints corresponds to breaking on a message received by the third computing device.

3. The system of claim 1, wherein at least one of the first and second breakpoints corresponds to breaking on a service running on the third computing device.

4. The system of claim 1, wherein at least one of the first and second breakpoints corresponds to breaking on a message type associated with a message received by the third computing device.

5. The system of claim 1, wherein the message is transmitted by the third processor to a fourth computing device.

6. The system of claim 5, wherein the message is additionally transmitted by the third computing device to a fifth computing device.

7. A method for distributed debugging in an extensible Simple Object Access Protocol (SOAP) environment of asynchronous software web services, the method comprising:
    transmitting into a communications network, a SOAP message from a message originator device, the SOAP message including a first breakpoint together with a security entry for the first breakpoint, the security entry including at least one of an identity, a signature, or encryption of the first breakpoint;
    receiving the SOAP message in a message tagger device that authenticates the message and inserts into the message, a second breakpoint that is different than the first breakpoint;
    transmitting by the message tagger device to an intended recipient device, the message containing authentication information and the first and second breakpoints;
    processing the message by a debugger on the intended recipient device;
    receiving by the message originator device, a call back message from the intended recipient device if the first breakpoint has been triggered; and receiving, by the message tagger device from the intended recipient device, a second call back message, if the second breakpoint has been triggered.

8. The method of claim 7, further comprising:

halting, in the intended recipient device, a first processing thread that determined that the breakpoint condition had been reached.

9. The method of claim 8, further comprising:

continuing to process, in the intended recipient device, a second processing thread running concurrently with the first processing thread on the same computer.

10. A distributed debugger system that includes a plurality of computer nodes, the system comprising:

a processor;

a first computer node implemented on the processor that is adapted to inject into a communications network a first message comprising a header that includes a security element and a diagnostics element, the diagnostics element including a condition element and a breakpoint element;

a second computer node that is adapted to inject into the communications network a second message comprising a header that includes a security element and a diagnostics element, the diagnostics element including a condition element and a breakpoint element; and a third computer node that is: a) adapted to receive the first message, authenticate the first message and if the condition element is satisfied, trigger the breakpoint identified in the breakpoint element of the first message and send a call back message to the first computer node indicating that the breakpoint has been triggered, and b) adapted to receive the second message, authenticate the second message and if the condition element is satisfied, trigger the breakpoint identified in the breakpoint element of the second message and send a call back message to the second computer node indicating that the breakpoint has been triggered, and wherein the third computer node is further adapted to operate upon the first and second messages concurrently with each message being operated upon using independent processing threads.

11. The system of claim 10, wherein the first node maintains a first time base and the third computer node maintains a second time base that is different from the first time base, and wherein at least one of the first time base or the third time base permits a timing adjustment for debugging purposes.

12. The system of claim 11, wherein the second computer node maintains a third time base that is isolated from the first time base.

13. The system of claim 10, wherein the first and third computer nodes are slaved to a distributed master clock so that timestamps across the nodes can be rationalized.

14. The system of claim 11, wherein the timing adjustment comprises slowing down time over the computer nodes to enable the debugger to uncover timing-related bugs.

15. The system of claim 11, wherein the timing adjustment comprises halting time to enable the debugger to uncover timing-related bugs.

16. The system of claim 11, wherein the timing adjustment comprises reversing time to enable the debugger to uncover timing-related bugs.

\* \* \* \* \*